G. F. JEROME.
Halter Holder.
No. 43,643.    Patented July 26, 1864.
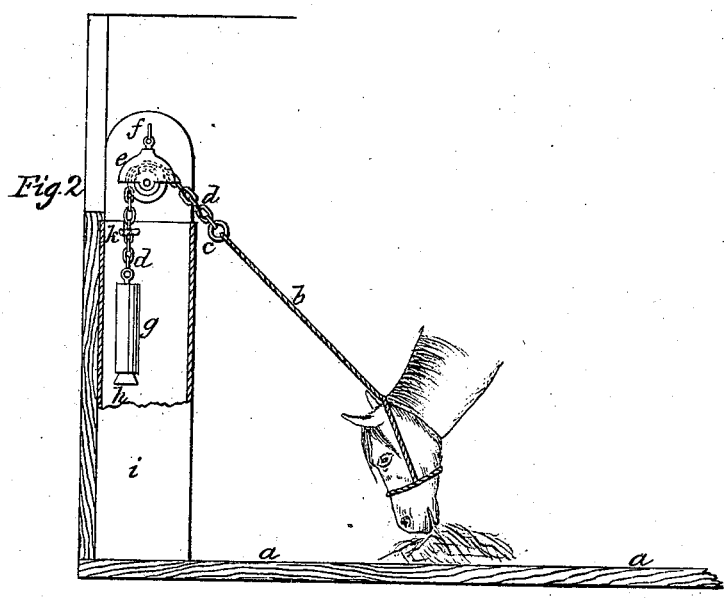
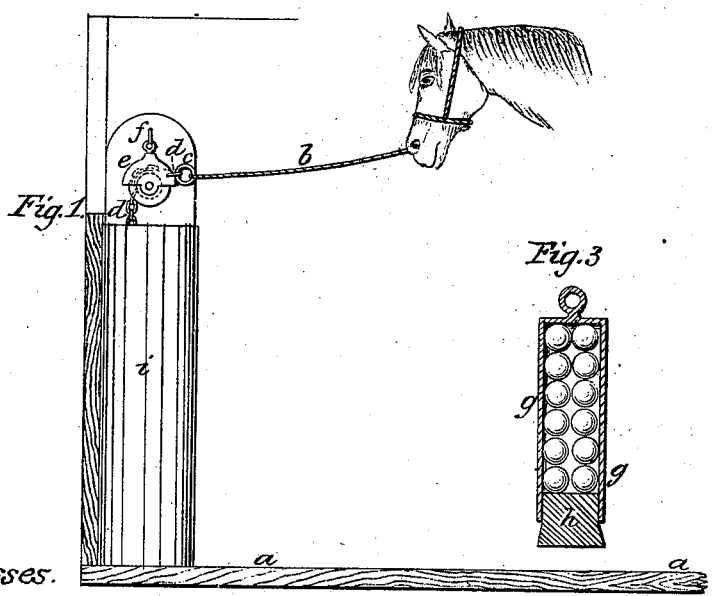
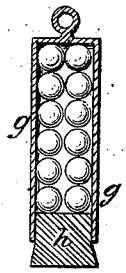
Witnesses.
Lemuel W. Serrell
Thos. Geo. Harold
Inventor.
George F. Jerome

UNITED STATES PATENT OFFICE.

GEORGE F. JEROME, OF HEMPSTEAD, NEW YORK.

IMPROVEMENT IN HALTER-HOLDERS.

Specification forming part of Letters Patent No. 43,643, dated July 26, 1864.

*To all whom it may concern:*

Be it known that I, GEORGE F. JEROME, of Hempstead, in the county of Queens and State of New York, have invented, made, and applied to use a certain new and useful Improvement in Halter-Holders for Animals; and I do hereby declare the following to be a full, clear, and exact description of the said invention, reference being had to the annexed drawings, making part of this specification, wherein—

Figure 1 is an elevation of said halter-holder, with the animal standing at rest. Fig. 2 is a similar view, with the animal feeding off the ground or floor; and Fig. 3 is a section of the variable weight-box.

Similar marks of reference denote the same parts.

The nature of my said invention consists in a halter holder fitted to be adjustable as to the amount of movement allowed to the animal and the weight employed to take up the slack of the halter, so that only so much weight is applied as is necessary, according to the weight of the halter, so that the animal is free to move within the range of motion allowed by said halter.

In the drawings, *a* represents a portion of the floor of a stall or place to which a horse or other animal is to be tied. *b* is a halter from the head of the animal to the ring or eye *c* of the adjustable halter holder, chain, or rope *d*, which passes through a block or pulley, *e*. This pulley is attached or suspended from the hook *f*, or in any other convenient manner so that it will turn or swivel as acted upon by the halter and halter-holder.

At the lower end of the chain *d* is a hollow weight-box, *g*, with a plug, *h*, at its end, so that any desired amount of weight—such as pebbles, gravel, or stones—can be introduced that will be sufficient to draw in the halter and keep it from hanging down or becoming entangled as the animal moves. The inclosing-case *i* protects the weight and prevents its becoming obstructed in its movement by anything coming in contact therewith.

The chain or rope *d* is provided with a cross-bar or stop, *k*, which may be placed at any desired point along said chain or rope, and, coming up against the block *e*, prevents the halter-holder being drawn out any farther, and determines the range of motion allowed the animal. Thus my apparatus becomes an adjustable halter-holder; and it will be seen that the ring or eye *c* is always in place for the halter to be buckled, tied, or hitched thereto, and determines the amount said halter is taken up. This ring at the end of the halter-holder, when it comes in contact with the pulley, takes the weight off the halter and the animal's head, so that he is free to move within a given range without the weight being operative.

With my device there is no fear of the animal being injured by becoming entangled in the halter, and only the weight required for drawing up the halter is applied to the halter-holder.

I do not claim a weight applied to a halter to draw the same up, as this has before been used; but

What I claim, and desire to secure by Letters Patent, is—

1. A halter-holder formed of the weighted chain or rope over a pulley or block, and provided with a hitching and stopping ring, or its equivalent, to determine the amount said halter is taken up, and thereby relieve the animal's head from the weight, as specified.

2. The movable bar or stop *k*, in combination with the halter-holder *d*, to determine the range allowed to the animal, as specified.

3. The combination of the halter-holder *d*, weight *g*, and inclosing-case *i*, for the purposes and as specified.

4. The weight-box *g*, fitted to contain more or less weight, in combination with the halter-holder *d*, for the purposes and as specified.

In witness whereof I have hereunto set my signature this 23d day of March, A. D. 1864.

GEORGE F. JEROME.

Witnesses:
LEMUEL W. SERRELL,
THOS. GEO. HAROLD.